United States Patent [19]

Kiss

[11] Patent Number: 4,655,861
[45] Date of Patent: Apr. 7, 1987

[54] PROCESS FOR PRODUCING MOLDINGS WITH DEFORMABLE DECORATIVE SURFACE

[76] Inventor: Günter H. Kiss, Willdenowstrasse 20, D-1000 Berlin 45, Fed. Rep. of Germany

[21] Appl. No.: 675,199

[22] Filed: Nov. 27, 1984

[30] Foreign Application Priority Data

Nov. 28, 1983 [DE] Fed. Rep. of Germany ....... 3343330

[51] Int. Cl.⁴ .................. B32B 5/06; B32B 5/20
[52] U.S. Cl. .................. 156/62.2; 156/79; 264/45.3; 264/46.3; 264/112; 264/119; 264/171; 264/257; 264/324; 428/102
[58] Field of Search .................. 264/45.3, 45.8, 46.1, 264/46.3, 46.5, 171, 257, 112, 119, 324; 428/102; 156/62.2, 62.4, 243, 221, 228, 79

[56] References Cited

U.S. PATENT DOCUMENTS

| | | | |
|---|---|---|---|
| 1,336,404 | 4/1920 | Weiss | 156/62.2 X |
| 2,948,650 | 8/1960 | Jackson et al. | 156/62.2 X |
| 2,969,301 | 1/1961 | Finger | 264/119 X |
| 2,980,570 | 4/1961 | Cook et al. | 156/62.4 X |
| 3,147,546 | 9/1964 | Bowman et al. | 29/424 |
| 3,276,928 | 10/1966 | Pearson et al. | 156/62.4 |
| 3,536,557 | 10/1970 | Goldstone | 156/228 |
| 3,657,032 | 4/1972 | Watanabe et al. | 156/62.4 |
| 3,773,876 | 11/1973 | Rath et al. | 264/46.5 |
| 4,000,028 | 12/1976 | Hoey | 156/228 X |
| 4,131,664 | 12/1978 | Flowers et al. | 264/119 X |
| 4,156,754 | 5/1979 | Cobbs, Jr. et al. | 264/46.5 |
| 4,198,460 | 4/1980 | Kiss | 428/284 |
| 4,207,282 | 6/1980 | Grisch | 264/257 |
| 4,295,907 | 10/1981 | Cordts et al. | 264/112 |
| 4,348,248 | 9/1982 | Poncet | 156/62.4 X |
| 4,376,749 | 3/1983 | Woelfel | 264/324 X |
| 4,439,477 | 3/1984 | Kiss | 428/102 |
| 4,568,581 | 2/1986 | Peoples, Jr. | 264/119 X |

FOREIGN PATENT DOCUMENTS

| | | | |
|---|---|---|---|
| 469475 | 11/1950 | Canada | 156/62.2 |
| 547242 | 10/1957 | Canada | 156/62.2 |
| 1164779 | 4/1984 | Canada | |
| 2945977 | 5/1981 | Fed. Rep. of Germany | |
| 817841 | 9/1937 | France | 156/62.2 |
| 648816 | 1/1951 | United Kingdom | 156/62.2 |
| 1214397 | 12/1970 | United Kingdom | 156/62.2 |
| 1582277 | 1/1981 | United Kingdom | |

*Primary Examiner*—Philip Anderson
*Attorney, Agent, or Firm*—Basile, Weintraub & Hanlon

[57] ABSTRACT

A process for producing fibrous material moldings surface-coated with a decorative sheeting is described. Cellulose and/or lignocellulose fibers are mixed with binders and are compressed by single-stage or multi-stage moldings, so that the decorative sheeting covering the finished molded surface is used as a supporting sheet for the non-woven fabric to be shaped. The fibrous material mixture is placed on the side of the decorative sheeting provided with an adhesive, and thus, a mat fleece whose entire surface is joined to the decorative sheeting is produced therefrom. The adhesive between the decorative sheeting and the non-woven fabric can be an adhesive foam.

4 Claims, 2 Drawing Figures

PROCESS FOR PRODUCING MOLDINGS WITH DEFORMABLE DECORATIVE SURFACE

BACKGROUND OF THE INVENTION

I. Field of the Invention

The present invention relates to a process for producing fibrous moldings in which the surface is coated by means of thermoplastically deformable decorative sheeting.

II. Description of the Prior Art

Over the last few years, increasing interest has been attached to fibrous moldings, particularly among automobile manufacturers for use as side, door, and roof coverings. The automotive industry is continually attempting to produce more components which are more robust, lighter and cheaper, while still being stylistically and acoustically advantageous. A considerable contribution to this development has been made by moldings of cellulose and/or lignocellulose fibrous material or those containing proportions thereof. Continuously improved molding technology and virtually unlimited possibilities for shaping such moldings from said fibrous material contribute to increased comfort in the automobile and have become an important constructional feature with respect to the matching of the individual components of the inside fittings.

Decorative sheeting is frequently used as the reference or standard material for the surface finishing of such moldings produced from fibrous mats, said sheeting being suitable for fulfilling the desired requirements of appearance, feel, and surface strength.

In this connection, a process for producing a covering for the interior of a vehicle having a surface structure is disclosed in West German Pat. No. DAS 2,625,773. This covering is made of a carrier or support deformable by heat and pressure, and a thermoplastic material fixed thereto by supplying heat, and which is foam-like on the side facing the carrier, such material being supplied without a surface structure, the latter being produced by hot stamping which simultaneously forms connections between the carrier and the thermoplastic material. The carrier comprises a pre-shaped molding of cardboard, polypropylene with sawdust filling, hybrid material, hard boards, phenolic resin-bonded cotton fibers, or the like, to which is applied the decorative sheeting over its entire area, in an operation which produces a surface structure and simultaneously profiles the carrier.

DESCRIPTION OF THE PRESENT INVENTION

The present invention is a process for producing surface-coated moldings of the aforementioned type which make it possible to reduce the number of process stages hitherto required for producing such moldings, accompanied by a simplification thereof.

When producing a non-woven fabric, e.g. from cellulose or lignocellulous fibrous material, and/or during the molding of corresponding fibrous mat portions to premoldings or moldings, it is advantageous to use supporting layers, particularly when it is desired to produce spatially complicated molding structures. For example, West German Pat. No. DOS 2,945,977 and No. DOS 2,730,750 describe such supporting layers, which are partly incorporated into mat fleeces. It is therefore an important advantage of the present process that, contrary to what has been the case up to now, there is no need for a separate supporting sheet. As a result of the present invention, it is possible to use the decorative sheeting used for the surface coating of the molding and which is present in the form of a continuous sheet to provide the necessary support. The fiber connection between the non-woven fabric is advantageously homogenized and stabilized by the use of thermoplastic individual fibers together with cellulose-containing stable fibers. These fibers wholly or partly fulfill the function of th thermoplastic binder which would otherwise be added to such a non-woven fabric. Thus, the production of the fibrous mixture is already simplified before the non-woven fabric is formed; it then only being necessary to admix therewith one or more thermosetting binders which, with respect to said binder, preferably takes place in the form of a suitable dispersion.

As it is made from a thermoplastic material, the decorative sheeting can be applied in such a way that the mat/sheeting connection can be directly produced during molding the molded article. However, the side coming into contact with the fibrous mat can also be subject to the action of an activable adhesive, which ensures an area-wide continuous connection.

The adhesive can advantageously be an adhesive foam, which gives the decorative sheeting a pleasant, soft feel, particularly if low density moldings are produced with a low surface pressure.

Thus, the present process leads to a preliminary connection or bond being formed between the thermoplastic decorative sheeting and the binder-containing, non-woven fabric layer, the decorative sheeting replacing the otherwise necessary elastic intermediate layer during the molding process, while the thermoplastic individual fiber proportion obviates the need for adding theremoplastic binder.

A further advantageous development of the present procedure is provided by the use of a double layer which, apart from the decorative sheeting, also uses a thermoplastically deformable protective layer which is drawn over the decorative sheeting layer, which is not only able to protect the decorative sheeting during the molding process, but also performs that function during subsequent storage and shipment of the molding and up to the time of its installation, e.g. as an internal lining or covering of a vehicle door, and even during the actual installation. The protective layer can then be dissolved in a residue-free manner, so that the completely satisfactory surface of the decorative sheeting can then be appropriately exposed.

The application of a thermoplastic backing layer on the molding side, opposite to the decorative sheeting, can serve to completely protect the same from the absorption of moisture thus giving it increased surface strength and the like.

In this connection, it is particularly advantageous to process a low densitiy backing layer, which additionally contributes to a further reduction of the overall weight of the molding.

If the decorative layer used as the supporting layer during the molding process is made from a thermoplastic material with a low softening temperature, it is very advantageous to keep the shaping surface of the mold coming into contact with the decorative sheeting during molding at a lower temperature than that of the opposite mold half.

BRIEF DESCRIPTION OF THE DRAWINGS

The invention is described in greater detail hereinafter relative to non-limitative but preferred embodiments and the attached drawings, wherein.

DETAILED DESCRIPTION OF THE PREFERRED EMBODIMENTS

Figure 1:
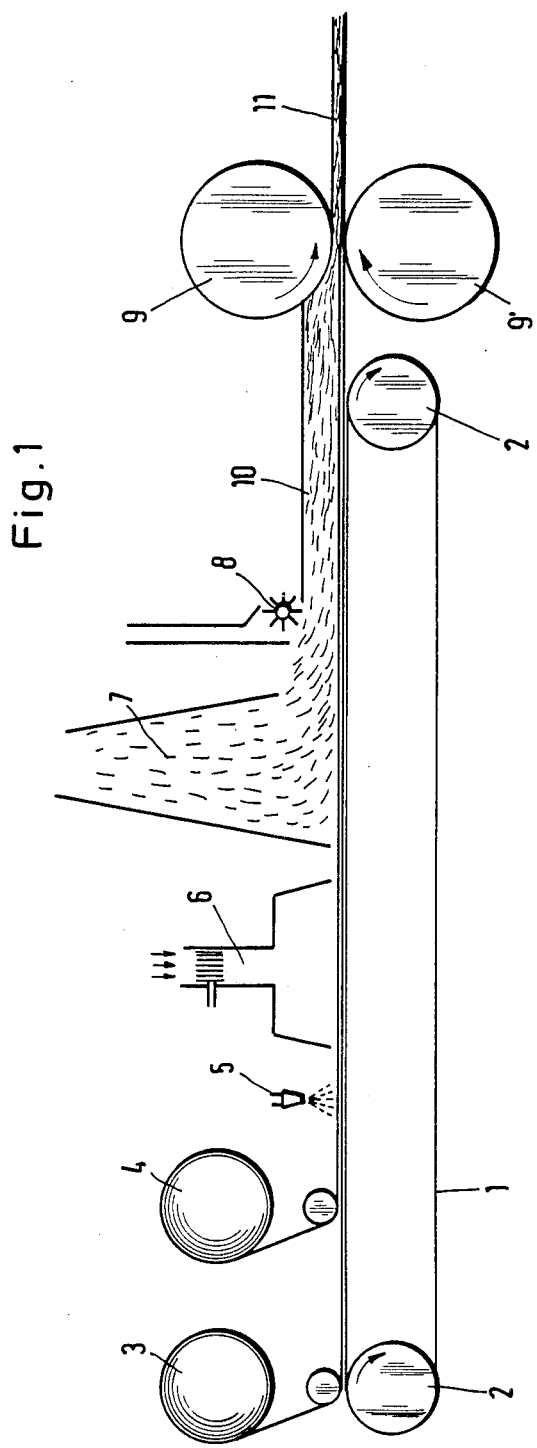
FIG. 1 respresents the production of the mat fleece according to the invention by means of a diagrammatic longitudinal sectional representation.

In FIG. 1, a deformable protective layer 3 and a decorative sheeting 4 are drawn in to the apparatus with the aid of a conveyor belt 1, which is moved in the direction of the arrows by drive rollers 2, and are conveyed through the apparatus. With the aid of a row of spraying heads 5, an adhesive is applied to the back of decorative sheeting 4; this can be wholly or partly developed with the aid of a hot air blower 6 if it is a foamable adhesive. A fibrous material is placed onto said adhesive with the aid of the sprinkling head 7 and the coating thickness of said material is leveled with the aid of a milling roller 8, so that there is a uniform mat fleece strand 10, which can be compressed with the aid of calender rolls 9 so that a readily handleable mat fleece strand 11 is obtained, which can be subsequently further processed.

The same installation can naturally also produce a mat fleece without the protective layer 3. The row of spraying heads 5 can also be used to apply a non-foamable adhesive to the back of decorative sheeting 4. In this case, the hot air blower 6 either remains unused, or is used to set the adhesiveness of the adhesive substance to desired values by preliminary drying.

Figure 2:
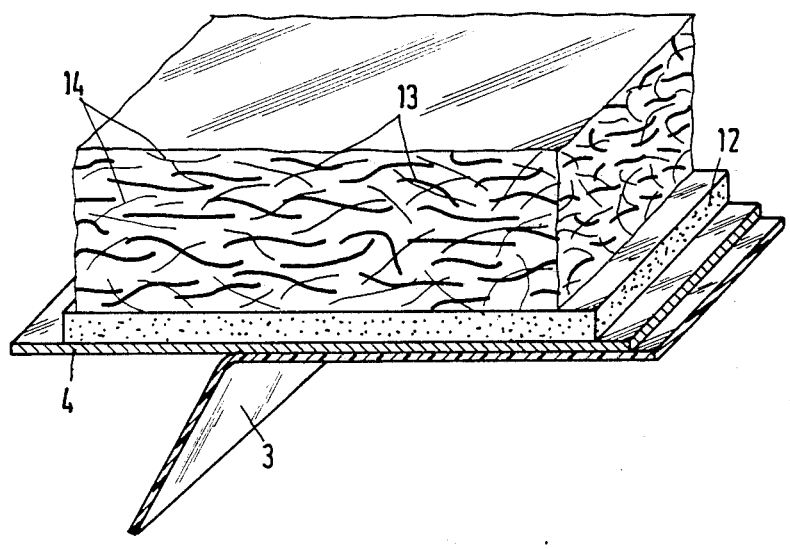
FIG. 2 represents the construction of complete mat fleeces by means of a spatial cutaway representation.

In th perspective representation of FIG. 2, reference numeral 3 represents the removable and deformable protective layer, which protectively covers the visible side of decorative sheeting 4. Reference numeral 12 represents a foamable adhesive coating which in this state gives the decorative sheeting 4 the necessary "good feel". The actual fibrous layer of the mat fleece comprises cellulose-containing fibers 14 which, according to the prior art, are precoated with at least one binder before being introduced onto the adhesive by means of the sprinkling head 7 of FIG. 1, and thermoplastically softenable and deformable additional fibers 13. The thus formed mat fleece is cut to the desired introduction dimensions and is subsequently shaped to the finished part by a preferably two-stage molding and compression. This shaping takes place in at least one molding stage with heated molds. In this way, the protective layer 3 and the decorative sheeting 4 in each case acquire the necessary deformability, while the thermoplastic fibers in the fleece are also softened and assume additional binder functions.

What is claimed is:

1. A process for producing a molding having a detachable protective layer, a thermoplastically deformable decorative sheeting releasably attached to the protective layer, a foamable adhesive layer attached to the decorative layer opposed to the protective layer and a non-woven fibrous mat attached to the foamable adhesive layer comprising the steps of:

drawing the protective layer off from a first reel;
    drawing the thermoplastically deformable decorative sheeting off from a second reel;
    releasably laminating the protective layer to the decorative sheeting;
    conveying the laminate past a foamable adhesive depositing device while dispensing the foamable adhesive into engagement with the decorative sheeting, the decorative sheeting forming a supporting sheet therefrom;
    admixing cellulose-containing fibers, thermoplastic individual fibers and at least one binder to form a fibrous material;
    introducing the fibrous material onto the side of the decorative sheeting carrying the adhesive foam;
    compressing the fibrous material to a mat fleece whose entire surface is connected to the foamable adhesive to form a composite mat;
    shaping the composite mat by at least one hot molding step, the hot molding step employing a variable temperature mold having a low temperature zone which comes in contact with the thermoplastically deformable decorative sheeting and higher temperature zone which contacts the fibrous material.

2. The process according to claim 1, wherein following the production of the molding, the protective layer can be removed in a damage-free manner from the decorative sheeting at a randomly selectable time subsequent to hot molding.

3. The process according to claim 1, wherein a further thermoplastically deformable backing layer is firmly adhered to the fibrous mat on the side opposite to the decorative sheeting.

4. The process according to claim 1, wherein a tangled fiber fleece of thermoplastically deformable individual threads with a low weight per unit area is used for the decorative sheeting and/or the backing layer.

* * * * *